(12) United States Patent
Emanuelsson et al.

(10) Patent No.: US 10,149,186 B2
(45) Date of Patent: Dec. 4, 2018

(54) NODE AND METHOD FOR MONITORING AN ABILITY OF A WIRELESS DEVICE TO RECEIVE DOWNLINK DATA

(71) Applicant: Telefonaktiebolaget L M Ericsson (publ), Stockholm (SE)

(72) Inventors: Sven-Ove Emanuelsson, Nol (SE); Susana Fernandez Alonso, Madrid (ES); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 288 days.

(21) Appl. No.: 14/760,598

(22) PCT Filed: Oct. 7, 2014

(86) PCT No.: PCT/EP2014/071402
§ 371 (c)(1),
(2) Date: Jul. 13, 2015

(87) PCT Pub. No.: WO2016/055094
PCT Pub. Date: Apr. 14, 2016

(65) Prior Publication Data
US 2016/0255522 A1    Sep. 1, 2016

(51) Int. Cl.
*H04W 24/08*     (2009.01)
*H04W 4/70*      (2018.01)
(Continued)

(52) U.S. Cl.
CPC ............ *H04W 24/08* (2013.01); *H04W 4/70* (2018.02); *H04W 8/08* (2013.01); *H04W 8/10* (2013.01);
(Continued)

(58) Field of Classification Search
CPC ... H04W 24/08; H04W 4/005; H04W 72/048; H04W 8/08; H04W 76/022; H04W 72/0486
See application file for complete search history.

(56) References Cited

U.S. PATENT DOCUMENTS

2011/0158090 A1*  6/2011  Riley ................ H04L 12/14
                                                370/230
2014/0162582 A1*  6/2014  Daly ................. H04W 76/007
                                                455/404.1

OTHER PUBLICATIONS

"3rd Generation Partnership Project; Technical Specification Group Services and System Aspects; General Packet Radio Service (GPRS); Service description; Stage 2 (Release 12)," 3GPP TS 23.060 V12.0.0, Mar. 2013, 338 pages.
(Continued)

*Primary Examiner* — Edan Orgad
*Assistant Examiner* — Nourali Mansoury
(74) *Attorney, Agent, or Firm* — Rothwell, Figg, Ernst & Manbeck, P.C.

(57) ABSTRACT

Example embodiments presented herein are directed towards a Policy and Charging Rules Function (PCRF) node, a network node and a wireless device, as well as corresponding methods therein, for monitoring an ability of a wireless device to receive downlink data. The example embodiments presented herein provide a means of notifying an application server of when a wireless device is reachable. Thus, by knowing when the wireless device is reachable, the application server may avoid sending communication request to the wireless device when the device is unavailable. Thus, unnecessary signaling may be avoided.

21 Claims, 9 Drawing Sheets

(51) Int. Cl.
H04W 76/12 (2018.01)
H04W 8/10 (2009.01)
H04W 8/08 (2009.01)
H04W 72/04 (2009.01)
H04W 28/02 (2009.01)
H04W 76/28 (2018.01)

(52) U.S. Cl.
CPC ... *H04W 28/0247* (2013.01); *H04W 28/0252* (2013.01); *H04W 72/048* (2013.01); *H04W 72/0486* (2013.01); *H04W 76/12* (2018.02); *H04W 76/28* (2018.02)

(56) References Cited

OTHER PUBLICATIONS

"3rd Generation Partnership Project; Technical Specification Group Services and System Aspects; Policy and charging control architecture (Release 13)," 3GPP TS 23.203 V13.0.1, Jun. 2014, 220 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0, Mar. 2013, 290 pages.

"3rd Generation Partnership Project; Technical Specification Group Core Network and Terminals; General Packet Radio Service (GPRS); GPRS Tunnelling Protocol (GTP) across the Gn and Gp interface (Release 12)," 3GPP TS 29.060 V12.0.0, Mar. 2013, 176 pages.

"3rd Generation Partnership Project; Technical Specification Group Core Network and Terminals; Policy and Charging Control (PCC); Reference points (Release 12)," 3GPP TS 29.212 V12.0.0, Mar. 2013, 198. pages.

"3rd Generation Partnership Project; Technical Specification Group Core Network and Terminals; Policy and Charging Control signalling flows and Quality of Service (QoS) parameter mapping (Release 12)," 3GPP 29.213 V12.0.0, Jun. 2013, 196 pages.

"3rd Generation Partnership Project; Technical Specification Group Core Network and Terminals; Policy and Charging Control over Rx reference point (Release 12)," 3GPP TS 29.214 V12.0.0, Jun. 2013, 57 pages.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)" 3GPP TS 29.274 V12.0.0, Mar. 2013, 228 pages.

"3rd Generation Partnership Project; Technical Specification Group Services and System Aspects; Monitoring Enhancements; (Release 13)" 3GPP TR 23.789 v0.2.0, Aug. 2014, 18 pages.

"3rd Generation Partnership Project; Technical Specification Group Services and System and System Aspects; Monitoring Enhancements; (Release 13)" 3GPP TR 23.8xy v.0.1.0 Jun. 2014, 18 pages.

"3rd Generation Partnership Project;Technical Specification Group Services and System Aspects; Study on system enhancements for user plane congestion management (Release 13)" 3GPP TR 23.705 v1.0.0, Aug. 2014, 61 pages.

"3rd Generation Partnership Project; Technical Specification Group Services and System Aspects; Study on Machine-Type Communications (MTC) and other mobile data applications communications enhancements (Release 12)" 3GPP TR 23.887 V12.0.0 Dec. 2013, 151 pages.

Ericsson, "Power saving state solution," SA WG2 Temporary Document, SA WG2 Meeting #99, S2-133646, Sep. 2013, 8 pages.

NEC, "Discussion Paper on Congestion Indication Options," SA WG2 Meeting #96, S2-130806, Apr. 2013, 12 pages.

Ericsson, "Detailing solution 1," SA WG2 Meeting S2#106, S2-143940, Nov. 2014, 4 pages.

"3rd Generation Partnership Project; Technical Specification Group Services and System Aspects; Study on Optimizations to Support High Latency Communications; Stage 2 (Release 13)" 3GPP TR 23.709 V0.3.0, Feb. 2015, 32 pages.

International Search Report and Written Opinion issued by the International Searching Authority in corresponding International Application No. PCT/EP2014/071402, dated Jul. 6, 2015, 17 pages.

* cited by examiner

NODE AND METHOD FOR MONITORING AN ABILITY OF A WIRELESS DEVICE TO RECEIVE DOWNLINK DATA

CROSS REFERENCE TO RELATED APPLICATION(S)

This application is a 35 U.S.C. § 371 National Phase Entry Application from PCT/EP2014/071402, filed Oct. 7, 2014, the disclosure of which is incorporated by reference.

TECHNICAL FIELD

Example embodiments presented herein are directed towards a Policy and Charging Rules Function (PCRF) node, a network node and a wireless device, as well as corresponding methods therein, for monitoring an ability of a wireless device to receive downlink data.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, for example, by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

SUMMARY

There is a rapid new development and worldwide adoption of the Internet of Things as well as continued growth of M2M technology and its large scale of applications. 3GPP has covered in its scope the support of these new technologies, allowing the use of the operator network to allow the control of this kind of applications.

On the other hand, it is quite common that this kind of devices has long sleeping cycles to save battery. The application that is controlling these devices may require contacting the device but, if the device is in Power Saving State, Suspend State, or any other situation where it is not contactable, the procedure will be rejected. Besides, the application will not know when the user is contactable again, so it has to try a number of times until the user equipment or wireless device is reachable again.

For a normal wireless device as well as for a machine type mobile device, depending on the intended service that application server may serve, the wireless device may be not suitable to be contacted to enable the intended service, for example, when wireless device is located in a congested cell, enabling such intended service will lead to even worse congestion situation. As another example, a certain service should be enabled in a certain location, for example, at home. The wireless device may attempt to initiate such service at work instead, such attempt should be stopped. This situation generates a lot of useless signaling towards the wireless device and uncertainty about when the wireless device will be available.

Thus, at least one example object of the example embodiments presented herein may be to minimize the above mentioned problems. The example embodiments presented herein provide a mechanism that allows the application to make use of the PCC architecture in order to get information about when the wireless device is contactable. At least one example advantage of the example embodiments presented herein is that signaling may be reduced as the application will only contact the wireless device once it is certain the wireless device is available and will accept the communication request.

Accordingly, some of the example embodiments are directed towards a method, in a PCRF node, for monitoring an ability of a wireless device to receive downlink data. The PCRF node is in a wireless communications network. The method comprises receiving, from an application server, a request message to monitor the ability of the wireless device to receive downlink data. The method also comprises transmitting, to at least one network node, an application server initiated status request to check a congestion status of the wireless device with respect to a congestion threshold and/or a reachability status of the wireless device. The method further comprises receiving, from the at least one network node, the congestion status and/or the reachability status of the wireless device. The method also comprises determining if the wireless device is able to receive downlink data based on the congestion status and/or the reachability status. If the wireless device is able to receive downlink data, the method further comprises transmitting, to the application server, a notification that the wireless device is able to receive the downlink data.

Some of the example embodiments are directed towards a PCRF node for monitoring an ability of a wireless device to receive downlink data. The PCRF node is in a wireless communications network. The PCRF node comprises a receiving unit configured to receive, from an application server, a request message to monitor the ability of the wireless device to receive downlink data. The PCRF node further comprises a transmitting unit configured to transmit, to at least one network node, an application server initiated status request to check a congestion status of the wireless device with respect to a congestion threshold and/or a reachability status of the wireless device. The receiving unit is further configured to receive, from the at least one network node, the congestion status and/or the reachability status of the wireless device. The PCRF node further comprises processing unit configured to determine if the wireless device is able to receive downlink data based on the congestion status and/or the reachability status. If the wireless device is able to receive downlink data, the transmitting unit is further configured to transmit, to the application server, a notification that the wireless device is able to receive the downlink data.

Some of the example embodiments are directed towards a method, in a network node, for monitoring an ability of a wireless device to receive downlink data. The network node is in a wireless communications network. According to some of the example embodiments, the network node may be a RCAF, a PCEF, a mobility management node (e.g., a MME, SGSN, S4-SGSN, ePDG, TWAN, HSGW or SGW over the Gxx/Gx/Sx/interface). The method comprises receiving, from a PCRF node, an application server initiated status request to check a congestion status of the wireless device with respect to a congestion threshold or a reachability status of the wireless device. The method also comprises determining the congestion status or the reachability status of the wireless device. The method further comprises transmitting, to the PCRF node, the congestion status or the reachability status of the wireless device.

Some of the example embodiments are directed towards a network node for monitoring an ability of a wireless device to receive downlink data. The network node is in a wireless communications network. According to some of the example embodiments, the network node may be a RCAF, a PCEF, a mobility management node (e.g., a MME, SGSN, S4-SGSN, ePDG, TWAN, HSGW or SGW over the Gxx/Gx/Sx/interface). The network node comprises a receiving unit configured to receive, from a PCRF node, an application server initiated status request to check a congestion status of the wireless device with respect to a congestion threshold or a reachability status of the wireless device. The network node further comprises a processing unit configured to determine the congestion status or the reachability status of the wireless device. The network node also comprises a transmitting unit configured to transmit, to the PCRF node, the congestion status or the reachability status of the wireless device.

Some of the example embodiments are directed towards a method, in an application server, for monitoring an ability of a wireless device to receive downlink data. The application server is in a wireless communications network. The method comprises transmitting, to a PCRF node, a reachability request message to monitor the ability of the wireless device to receive downlink data. The method further comprises receiving, from the PCRF node, a notification that the wireless device is able to receive the downlink data based on the wireless device being in a connected mode, being in a valid location and/or a congestion status of the wireless device being lower than a congestion threshold. Upon receiving the notification, the method also comprises transmitting, to the wireless device, the downlink data.

Some of the example embodiments are directed towards an application server for monitoring an ability of a wireless device to receive downlink data. The application server is in a wireless communications network. The application server comprises a transmitting unit configured to transmit, to a PCRF node, a reachability request message to monitor the ability of the wireless device to receive downlink data. The PCRF further comprises a receiving unit configured to receive, from the PCRF node, a notification that the wireless device is able to receive the downlink data based on the wireless device being in a connected mode, being in a valid location and/or a congestion status of the wireless device being lower than a congestion threshold. Upon receiving the notification, the transmitting unit is further configured to transmit, to the wireless device, the downlink data.

DEFINITIONS

3GPP Third Generation Partnership Project
AAA Authorization Request Answer
AAR Authorization Request
AS Application Server
BSC Base Station Controller
BSSID Basic Service Set Identifier
CAN Connectivity Access Network
CCR Credit Control Request
E-UTRAN Evolved Universal Terrestrial Radio Access Network
EPC Evolved Packet Core
ePDG Evolved Packet Data Gateway
GERAN GSM/EDGE Radio Access Network
GPRS General Packet Radio Service
GSM Global System for Mobile Communications
HRPD High Rate Packet Data
HSGW HRPD Serving Gateway
HSS Home Subscriber Server
IMSI International Mobile Subscriber Identity
IP Internet Protocol
LTE Long Term Evolution
M2M Machine-to-Machine
MME Mobility Management Entity
PCC Policy Control and Charging
PCEF Policy and Charging Enforcement Function
PCRF Policy Control and Charging Rules Function
PDN Packet Data Network
PGW PDN Gateway
RAA Reauthorization Request Answer
RAN Radio Access Network
RAR Reauthorization Request
RBS Radio Base Station
RCAF Radio Congestion Aware Funtion
RNC Radio Network Controller
SCS Service Capability Server
SGSN Serving GPRS Support Node
SGW Serving Gateway
SSID Service Set Identifier
TWAN Trusted WLAN Access Network
UE User Equipment
UMTS Universal Mobile Telecommunications System
UTRAN UMTS Terrestrial Radio Access Network
WCDMA Wideband Code Division Multiple Access
WiFi Wireless Fidelity
WLAN Wireless Local Area Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN, E-UTRAN, Wi-Fi based system.

General Overview

Figure 1:
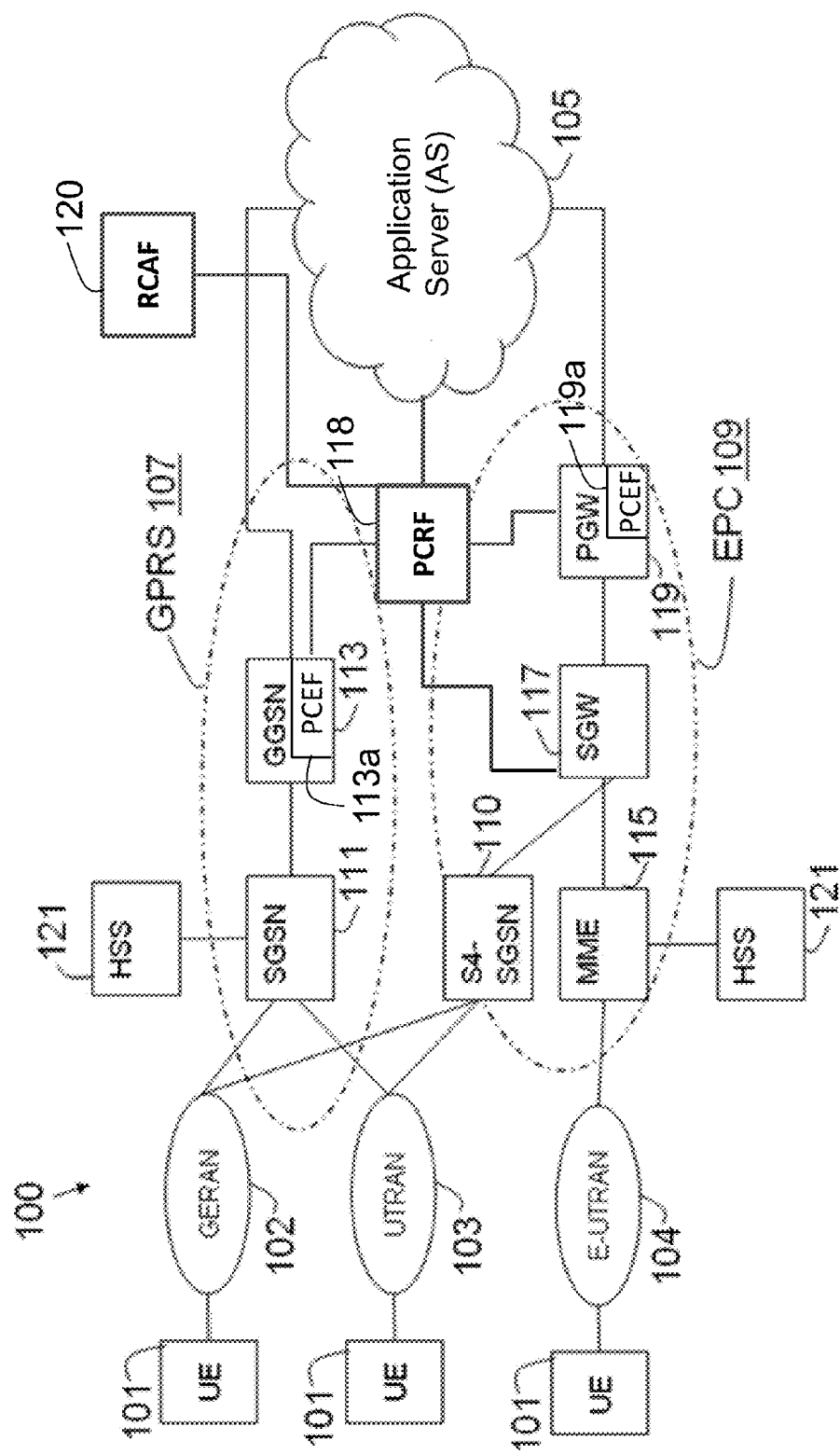
FIG. 1 is an illustrative example of a wireless network.

Example embodiments presented herein are directed towards a means of providing an application server, or an application in general, information regarding when a wireless device is reachable. In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to an Application Server (AS), SCS, or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The network of FIG. 1 may also comprise a Policy and Charging Rules Function (PCRF) 118, which may be configured to determine policy rules by accessing subscriber databases and other specialized functions, such as a charging system, in a centralized manner. The PCRF node 118 may be in communication with the PGW 119, the SGW 117, the GGSN 113 and a Radio Congestion Aware Function (RCAF) node 120. The RCAF node 120 monitors congestion in the network.

The network of FIG. 1 may further comprise a Policy Charging and Enforcement Function (PCEF) unit 113a or 119a, which may be comprised in the GGSN 113 or the PGW 119, respectively. The PCEF 113a or 119a is configured to provide user traffic handling and QoS at the Gateway. Furthermore, the PCEF 113a or 119a is also responsible for providing service data flow detection, counting along with online and offline charging interactions.

When there is downlink data available for the wireless device 101, the application server 105 may attempt to reach the wireless device. However, in attempting to reach the wireless device, such information may be used to reduce unnecessary signaling. Examples of unnecessary signaling may include attempting to reach the wireless device when the wireless device is not reachable due to, for example, the wireless device being in a sleep mode, congestion or the wireless device being in an invalid location.

Overview of the Example Embodiments

A need exists for reducing the amount of unnecessary signaling caused by an application server attempting to communication with an unavailable wireless device. Thus, example embodiments presented herein provide a means for providing the application server a notification of when the wireless device is reachable. Thus, the application server will not attempt to reach the wireless device when the device is not available, thereby preventing unnecessary signaling.

According to some of the example embodiments, the application server may subscribe to a new specific action referred to as a "Contactable mode" in the PCRF in order to be informed when the wireless device becomes contactable. The application server may subscribe to the action by sending a request message to the PCRF.

Based on any information provided in the request message and operator policies, the PCRF subscribes to be informed about when the wireless device is "reachable" by the network, for example, via a mobility management nodes (e.g., a MME, SGSN, S4-SGSN, ePDG, TWAN, HSGW or SGW over the Gxx/Gx/Sx/interface). The PCRF may further subscribe to be informed about when the wireless device surpass an acceptable congestion level over Np interface or whether or not the wireless device is in a valid location.

When the PCRF is informed that the wireless device is reachable, the PCRF may check if the last congestion level reported over Np interface allows the wireless device to be contactable, if the last reported user access information allows such service. The PCRF may check the last congestion level with respect to an allowable threshold level. The allowable threshold level may depend, for example, on subscription or operator policies associated with the wireless device. The PCRF may further check to see if the wireless device is currently in a valid location, for example, if the wireless device is within service range or within an operator's service coverage.

If it is determined that the wireless device is reachable by the application server, the PCRF informs the application server of such by making use of the new proposed specific action and/or by sending a notification message. The application server uses this information according to the application demands. According to some of the example embodiments, when the application servicer is interested in receiving the information once more, the application server will subscribe again and the complete procedure may be repeated.

Working Example

Figure 2:
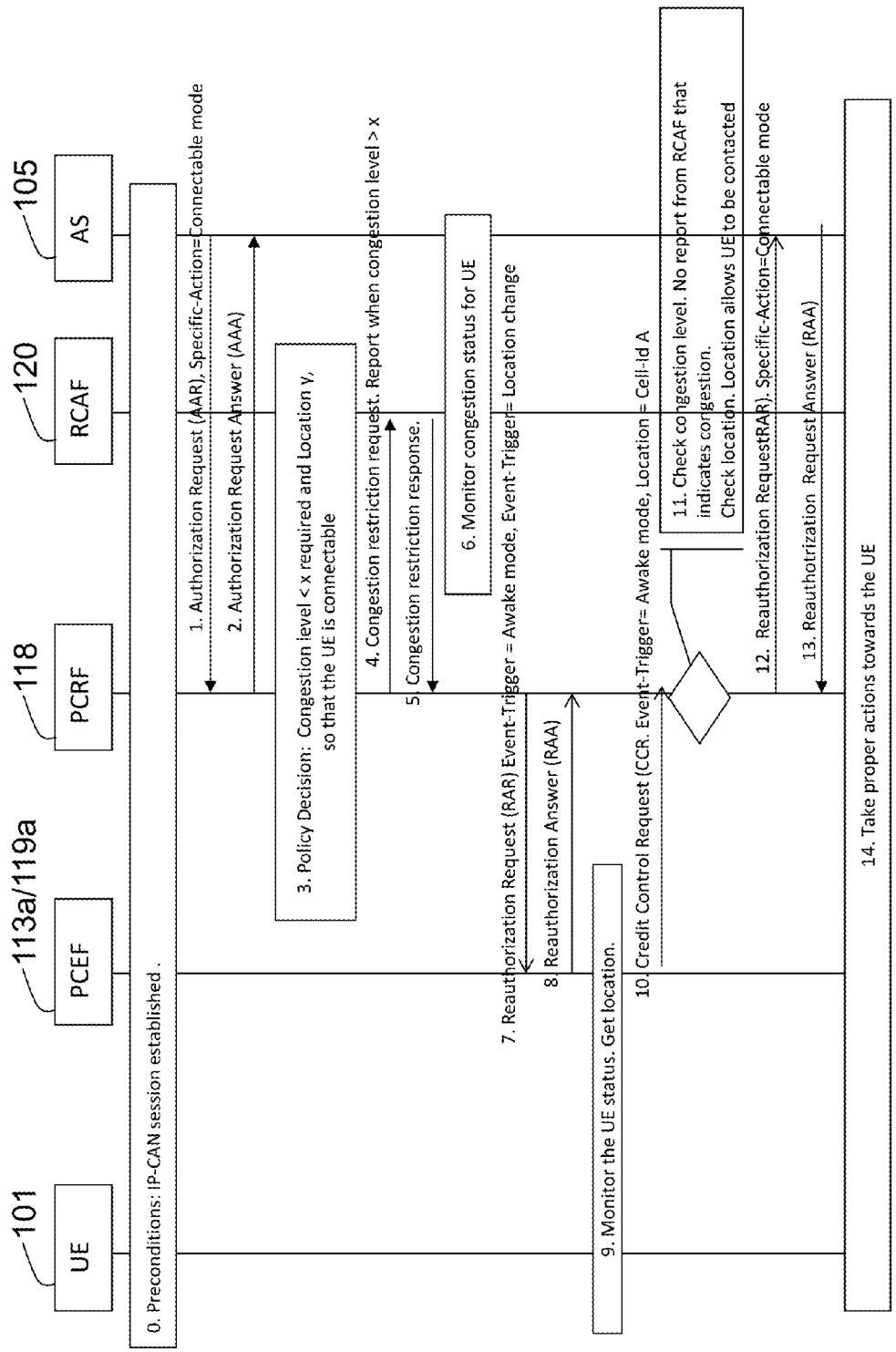
FIG. 2 is an example of a message passing diagram depicting some features of the example embodiments presented herein.

FIG. 2 illustrates a message passing diagram, according to some of the example embodiments presented herein. First, the various preconditions for establishing an IP-CAN session between a wireless device 101 and the wireless network may be performed (message 0). Once an application on the application server wishes to contact the wireless device 101, for example, to send the wireless device downlink data, the application server 105 will initiate/modify an AS session in order to subscribe to be informed when the wireless device is in a contactable mode (message 1).

According to some of the example embodiments, the application server 105 will send the PCRF 118 a request message to monitor the ability of the wireless device to receive downlink data. According to some of the example embodiments, the reachability request message may be an authorization request message (AAR), as illustrated in FIG. 2. The AAR may comprise a specific action, cause code, information element or flag indicating that the application server 105 wishes to be notified when the wireless device is reachable, i.e., able to receive downlink data. In the example provided by FIG. 2, a specific action 'Connectable mode' is provided in the AAR message.

The PCRF 118 may thereafter response with a response message (message 2). In the example provided by FIG. 2, the response message is an authorization request answer (AAA). The response message may provide an acknowledge to the application server 105 that the PCRF will notify the application server once the wireless device is reachable. Thereafter, the PCRF 118 will evaluate policy decisions in relation to an allowable congestion level, a valid or relevant location and the connectivity state of the wireless device 101 (action 3).

According to some of the example embodiments, the allowable congestion level is used as a threshold. For example, if a current congestion is lower than the allowable congestion level, the wireless device will be considered reachable with respect to congestion. It should be appreciated that once the PCRF has the congestion threshold associated with the wireless device, it need not be provided again. For example, there is no need for the application sever to continuously supply the congestion threshold for each attempt it makes of reaching the wireless device.

Once the PCRF 118 has determined the allowable congestion level, the PCRF will send, to a network node, an application server initiated status request message to check a congestion status of the wireless device with respect to the congestion threshold associated with the wireless device (e.g., the allowable congestion level) (message 4). Message 4 is referred to as an application server initiated request since the request is sent because of the request message sent by the application server, message 1.

In the example provided by FIG. 2, the application server initiated status request message is a congestion restriction request, which is sent to the RCAF 120. The RCAF will respond to the application server initiated status request message with a response message (message 5). In the example provided by FIG. 2, the response message is a congestion restriction response.

Thereafter, the RCAF 120 will monitor the level of congestion experienced by the wireless device (action 6). According to some of the example embodiments, the RCAF 120 will send a message to the PCRF only if a current congestion experienced by the wireless device 101 is greater than the allowable congestion level, i.e., the congestion threshold associated with the wireless device. Thus, if the PCRF does not receive any messaging or notifications from the RCAF, the PCRF will assume the congestion levels experienced by the wireless device are below any threshold or identified congestion levels.

In parallel, the PCRF 118 may also send, to a network node, an application server initiated status request message to check a reachability status of the wireless device (message 7). According to some of the example embodiments, the network node is a PCEF unit 113a or 119a or a mobility management node (e.g., a MME, SGSN, S4-SGSN, ePDG, TWAN, HSGW or SGW over the Gxx/Gx/Sx/interface). The network node will return a response message back to the PCRF (message 8). The network node will thereafter monitor the wireless device with respect to the reachability status (action 9).

According to some of the example embodiments, the application server initiated status request message with respect to the reachability status is a reauthorization request (RAR). According to some of the example embodiments, the reachability status is dependent on a connection mode of the wireless device. In such example embodiments, a trigger event, information element, cause code of flag may be provided in the status request message, which will trigger the network node to inform the PCRF when the wireless device is in an awake or connected mode. In the example provided by FIG. 2, an awake mode event trigger is provided in the request message.

According to some of the example embodiments, the reachability status is dependent on a valid location of the wireless device. In such example embodiments, a trigger event, information element, cause code of flag may be provided in the status request message, which will trigger the network node to inform the PCRF when the wireless device changes a current location or if the wireless device moves to a location from where the user cannot be contacted, such a location is herein defined as an invalid location. In the example provided by FIG. 2, a location change event trigger is provided in the request message. Such information may be provided by initiating a bearer modification procedure that includes an indication that the location has to be provided.

Once the PCEF unit 113a or 119a detects that the wireless device is awake or has changed a current location, the PCEF unit may send a notification to the PCRF 118 (message 10). In the example provided in FIG. 2, the notification is credit control request (CCR) message comprising an indication that the wireless device is in a connected or awake state and/or the current position (or recently changed position) of the wireless device. According to some of the example embodiments, the current position of the wireless device may be determined via a cell id or the BSSID/SSID in a WLAN network, etc.

Once receiving the notification, the PCRF 118 may check to see if a notification from the RCAF 120 has been sent (action 11). If a notification has been sent by the RCAF, the PCRF will know that the wireless device is experiencing a congestion level above the allowed or identified congestion level. Thus, if a notification has been sent, the notification will let the PCRF determine that the wireless device is not reachable due to a high congestion level.

If the PCRF has been informed that the wireless device is in a connected mode, is in a valid location and is not overly congested, the PCRF will send a notification to the application server that the wireless device is reachable or able to receive downlink data (message 12). In the example provided by FIG. 2, the notification is in the form of a reauthorization request (RAR). The application server may in return a reauthorization request answer (RAA) back to the PCRF (message 13). Thereafter, the application server may communicate with the wireless device (action 14).

In the example provided by FIG. 2, three conditions were presented for determining the reachability of the wireless device, namely, a congestion level, a connection mode and a valid location. It should be appreciated that the example embodiments presented herein may use any number or any combination of these conditions. Furthermore, in the example embodiments presented herein, it was the PCEF unit that provided information with respect to the reachability status of the wireless device, i.e., in regards to a connection mode and/or valid location. It should be appreciated that the example embodiments need not be limited to the PCEF unit providing such information. According to some of the example embodiments, a mobility management node (e.g., a MME, SGSN, S4-SGSN, ePDG, TWAN, HSGW or SGW over the Gxx/Gx/Sx/interface) may also provide such information.

Example Node Configurations

Figure 3:
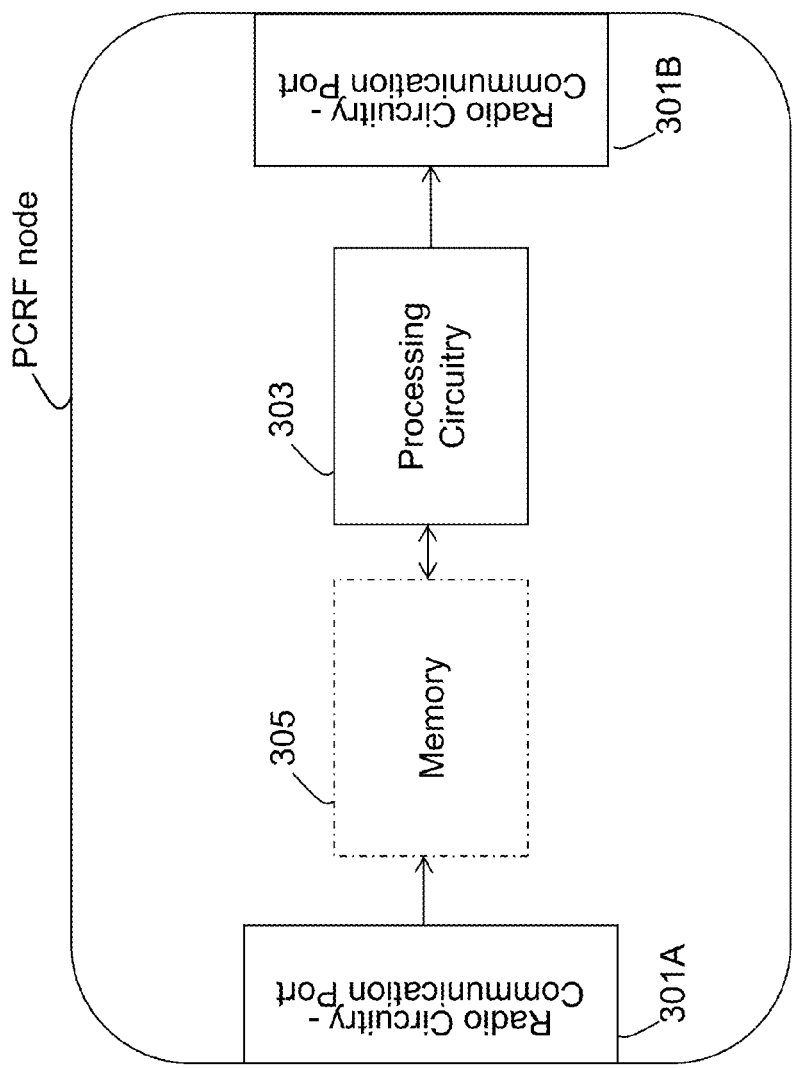
FIG. 3 is an example configuration of a PCRF node, according to some of the example embodiments.

FIG. 3 illustrates an example node configuration of a PCRF node 118. The PCRF node may perform some of the example embodiments described herein. The PCRF node may comprise radio circuitry, a communication port, a receiving unit 301A or a transmitting unit 301B that may be configured to receive and/or transmit communication data, instructions, any wireless device status related information and/or messages. It should be appreciated that the radio circuitry, the communication port, the receiving unit 301A or the transmitting unit 301B may be comprised as any number of transceiving, receiving, and/or transmitting units or circuitry. It should further be appreciated that the radio circuitry, the communication port, the receiving unit 301A or the transmitting unit 301B may be in the form of any input or output communications port known in the art. The radio circuitry, the communication port, the receiving unit 301A or the transmitting unit 301B may comprise or be in communication with RF circuitry and baseband processing circuitry (not shown).

The PCRF node may also comprise a processing unit or circuitry 303 which may be configured to provide, determine and/or process wireless device status information as described herein. The processing unit 303 may be any suitable type of computation unit, for example, a microprocessor, digital signal processor (DSP), field programmable gate array (FPGA), or application specific integrated circuit (ASIC), or any other form of circuitry or module. The PCRF node may further comprise a memory unit or circuitry 305 which may be any suitable type of computer readable memory and may be of volatile and/or non-volatile type. The memory 305 may be configured to store received, transmitted, and/or measured data, device parameters, communication priorities, and/or executable program instructions or any other form of information described herein.

Figure 4:
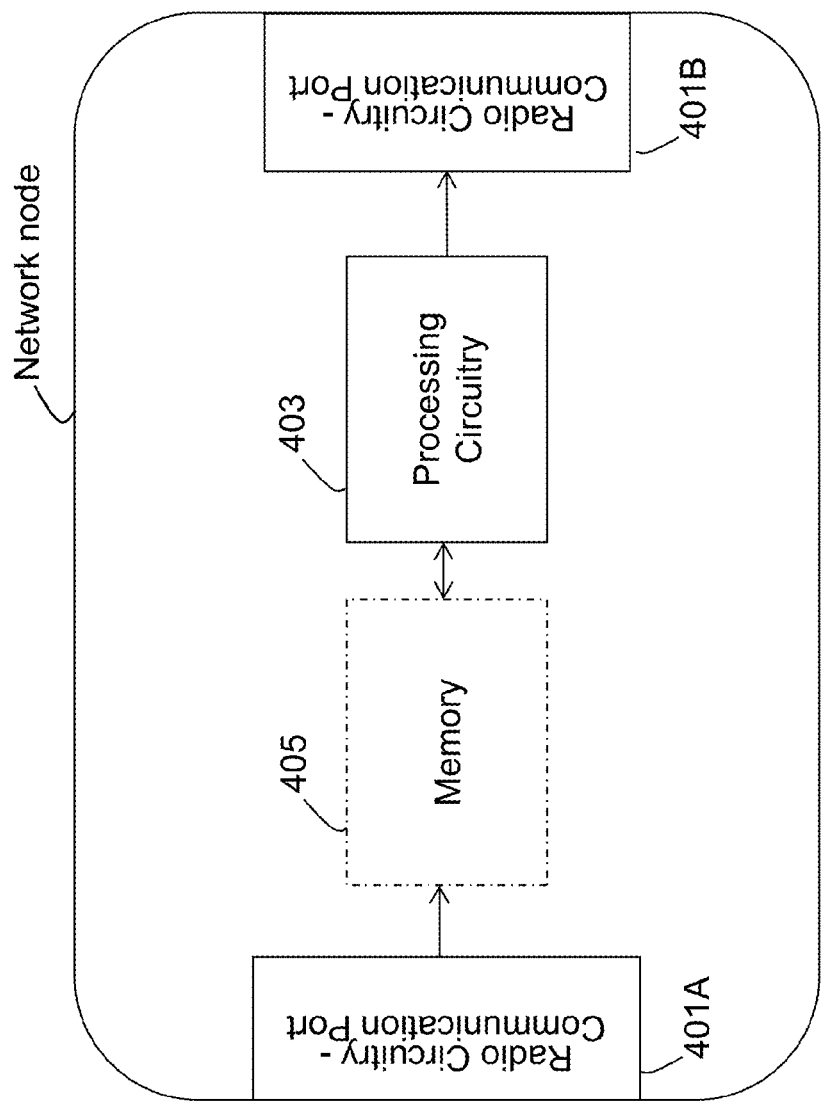
FIG. 4 is an example configuration of a network node, according to some of the example embodiments.

FIG. 4 illustrates an example node configuration of a network node. A network node may be a RCAF, a PCEF, a mobility management node (e.g., a MME, SGSN, S4-SGSN, ePDG, TWAN, HSGW, SWG over the Gxx/Gx/Sx/interface). The network node may perform some of the example embodiments described herein. The network node may comprise radio circuitry, a communication port, a receiving unit 401A or a transmitting unit 401B that may be configured to receive and/or transmit communication data, instructions, any wireless device status related information and/or messages. It should be appreciated that the radio circuitry, the communication port, the receiving unit 401A or the transmitting unit 401B may be comprised as any number of transceiving, receiving, and/or transmitting units or circuitry. It should further be appreciated that the radio circuitry, the communication port, the receiving unit 401A or the transmitting unit 401B may be in the form of any input or output communications port known in the art. The radio circuitry, the communication port, the receiving unit 401A or the transmitting unit 401B may comprise or be in communication with RF circuitry and baseband processing circuitry (not shown).

The network node may also comprise a processing unit or circuitry 403 which may be configured to provide, determine and/or process wireless device status information as described herein. The processing unit 403 may be any suitable type of computation unit, for example, a microprocessor, digital signal processor (DSP), field programmable gate array (FPGA), or application specific integrated circuit (ASIC), or any other form of circuitry or module. The network node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions or any other form of information described herein.

Figure 5:
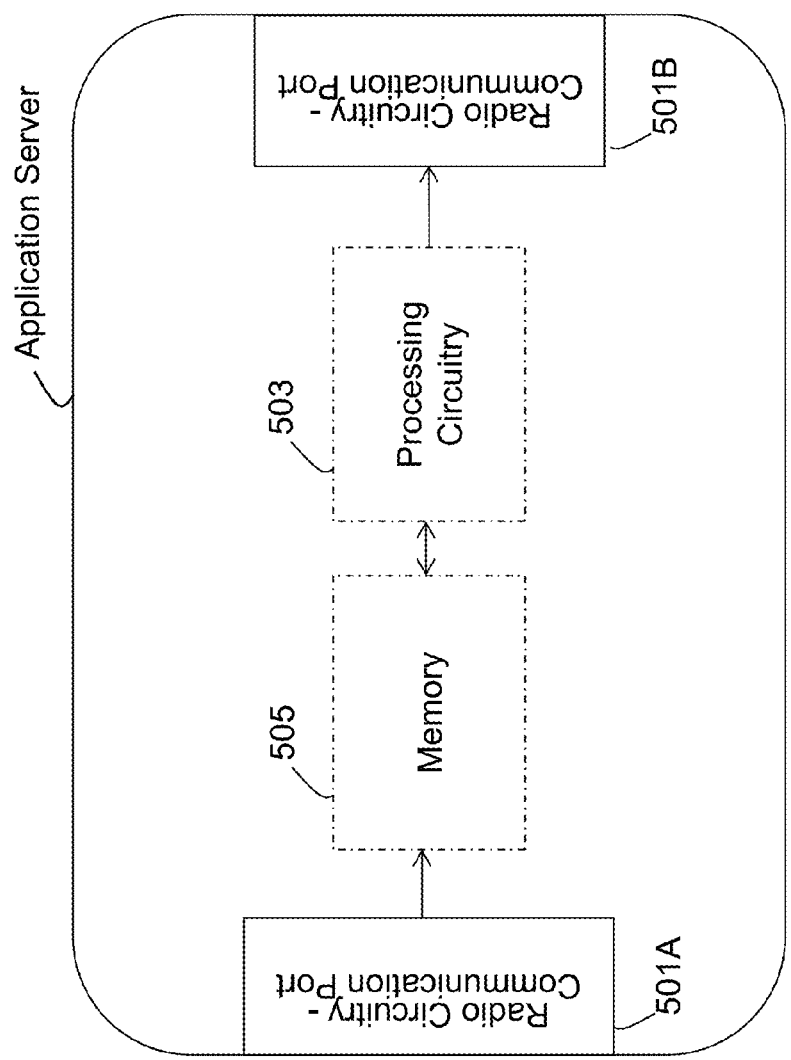
FIG. 5 is an example configuration of an application server, according to some of the example embodiments.

FIG. 5 illustrates an example node configuration of application server. The application server may perform some of the example embodiments described herein. The application server may comprise radio circuitry, a communication port, a receiving unit 501A or a transmitting unit 501B that may be configured to receive and/or transmit communication data, instructions, any wireless device status related information and/or messages. It should be appreciated that the radio circuitry, the communication port, the receiving unit 501A or the transmitting unit 501B may be comprised as any number of transceiving, receiving, and/or transmitting units or circuitry. It should further be appreciated that the radio circuitry, the communication port, the receiving unit 501A or the transmitting unit 501B may be in the form of any input or output communications port known in the art. The radio circuitry, the communication port, the receiving unit 501A or the transmitting unit 501B may comprise or be in communication with RF circuitry and baseband processing circuitry (not shown).

The application sever may also comprise a processing unit or circuitry 503 which may be configured to provide, determine and/or process wireless device status information as described herein. The processing unit 503 may be any suitable type of computation unit, for example, a microprocessor, digital signal processor (DSP), field programmable gate array (FPGA), or application specific integrated circuit (ASIC), or any other form of circuitry or module. The application server may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions or any other form of information described herein.

Example Node Operations

Figure 6A:
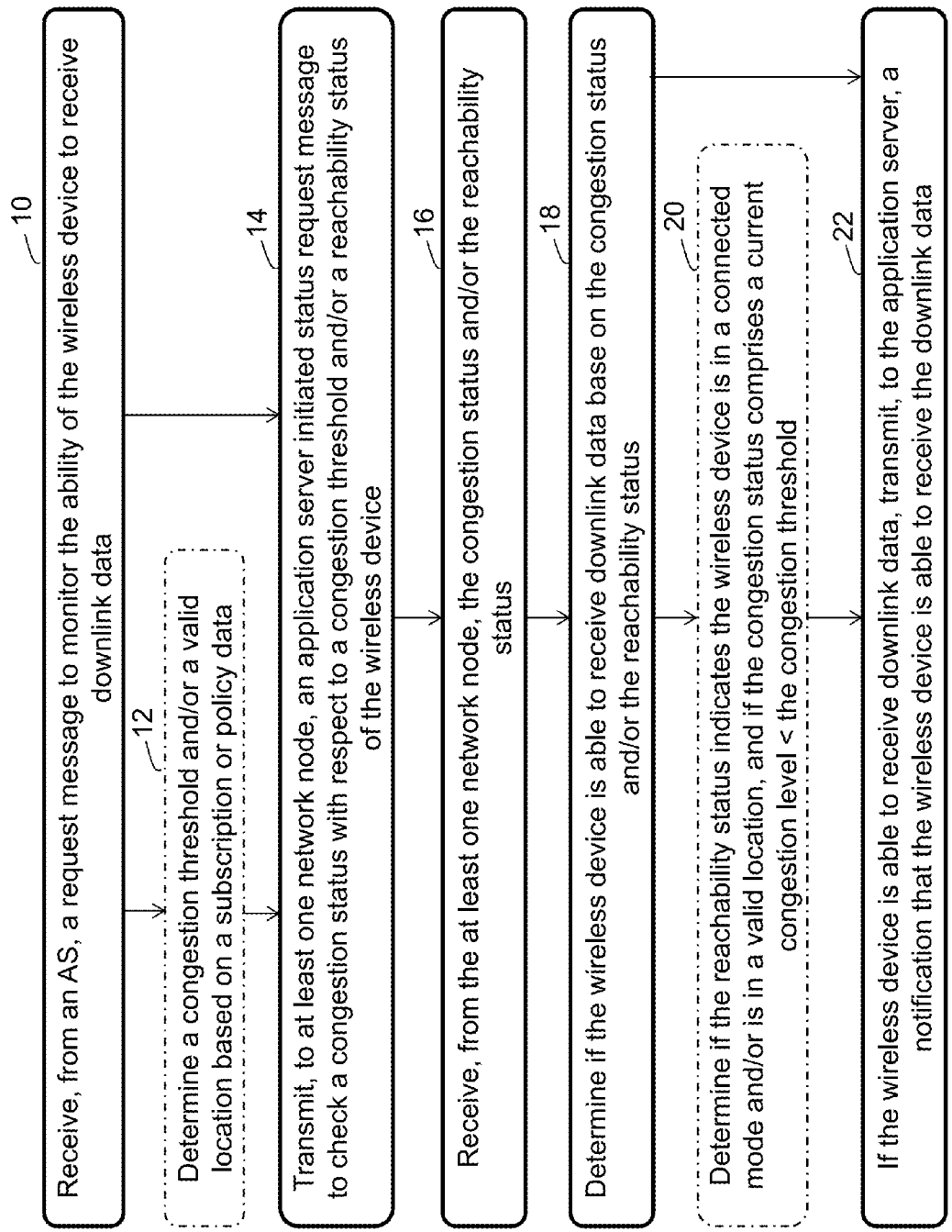
FIG. 6A is a flow diagram depicting example operations performed by the PCRF node of FIG. 3, according to some of the example embodiments.

FIG. 6A is a flow diagram depicting example operations which may be taken by a PCRF node as described herein for monitoring an ability of a wireless device to receive downlink data. It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 6B:
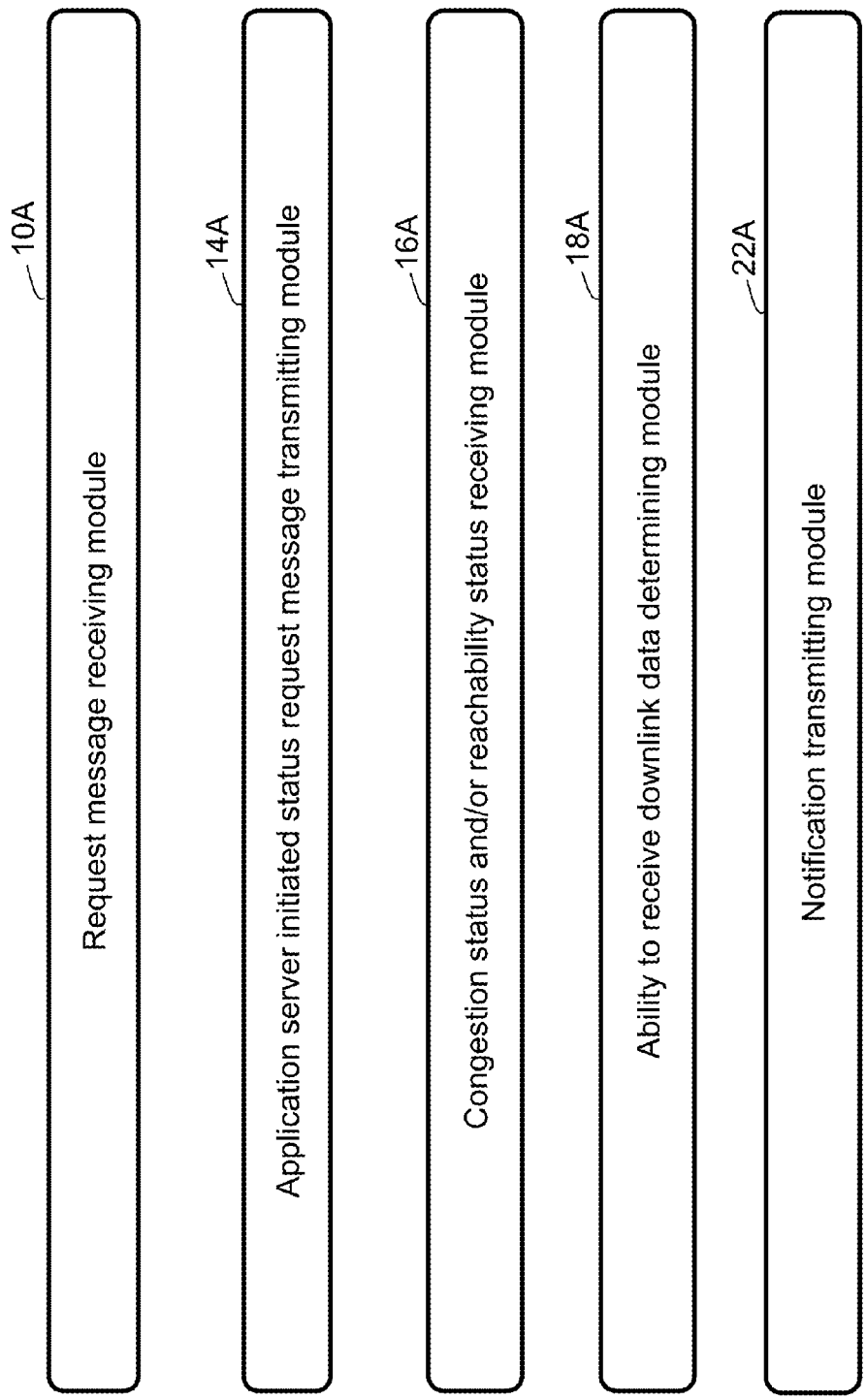
FIG. 6B is a module diagram of the PCRF node of FIGS. 3 and 6A, according to some of the example embodiments.

FIG. 6B is a module diagram describing modules of the PCRF node according to some of the example embodiments herein. The example node operations of the PCRF node will be described below in conjunction with at least FIGS. 2, 3, 6A and 6B.

Operation 10

The PCRF node 118 is configured to receive 10, from an application server 105, a request message to monitor the ability of the wireless device to receive downlink data. The receiving unit 301A is configured to receive, from the application server, the request message to monitor the ability of the wireless device to receive downlink data. The request message receiving module 10A is configured to receive, form the application server 105, the request message to monitor the ability of the wireless device to receive downlink data.

Thus, instead of trying to attempt to reach the wireless device, the application server may first send the request message to the PCRF node. By first sending the request message to the PCRF node, the application server may avoid a communication attempt with a wireless device that may not be available (e.g., due to being in a sleep mode, being in an invalid location, or being in a congested location, etc.). Therefore, by sending the request message to the PCRF node, the application server may minimize unnecessary network signaling. According to some of the example embodiments, the request message may be message 1 as depicted in FIG. 2.

Example Operation 12

According to some of the example embodiments, the PCRF node may determine 12 a congestion threshold and/or a valid location based on a subscription or policy data. The processing unit 303 may be configured to determine the congestion threshold and/or a valid location based on the subscription or policy data.

According to some of the example embodiments, the determination of the congestion threshold may be action 3 as depicted in FIG. 2. It should be appreciated that the congestion threshold may be used to determine a congestion status as discussed in relation to at least operation 14.

According to some of the example embodiments, the valid location may be used to determine the reachability status. A valid location may be defined as a location in which the wireless device is reachable. The location may be defined by a cell, tracking area, routing area, or any other means of defining coverage of a wireless device.

Operation 14

The PCRF node is further configured to transmit 14, to at least one network node, an application server initiated status request to check a congestion status or the wireless device with respect to a congestion threshold and/or a reachability status of the wireless device. The transmitting unit 301B is configured to transmit, to at least one network node, the application server initiated status request to check the congestion status or the wireless device with respect to the congestion threshold and/or the reachability status of the wireless device. The application sever initiated status request message transmitting module 14A is configured to transmit, to at least one network node, the application server initiated status request to check the congestion status or the wireless device with respect to the congestion threshold and/or the reachability status of the wireless device.

According to some of the example embodiments the at least one network node may be a RCAF, a PCEF, and/or a mobility management node (e.g., a MME, SGSN, S4-SGSN, ePDG, TWAN, HSGW or SGW over the Gxx/Gx/Sx/ interface). The status request is referred to as an application server initiated status request because the PCRF node is sending the status request based on, i.e., in response to, the request to monitor described in relation to example operation 10 and message 1 of FIG. 2.

According to some of the example embodiments, when the application server initiated status request is to check on the congestion status of the wireless device, the at least one network node is a RCAF node. In such example embodiments, the application server initiated status request may be message 4 of FIG. 2. Furthermore, the application server initiated status request message may comprise the congestion threshold described in relation to operations 12 and 14.

According to some of the example embodiments, a reachability status of the wireless device is determined from a connection state and/or location of the wireless device. Thus, the wireless device may be deemed reachable if it is in a connected state, i.e., not in a sleep mode, and/or if the wireless device is in a valid location, i.e., a location where the wireless device may be contacted.

According to the example embodiments where the reachability status of the wireless device is determined from a connection state, the at least one network node may be a PCEF unit, or a mobility management node (e.g., a MME, SGSN, S4-SGSN, ePDG, TWAN, HSGW or SGW over the Gxx/Gx/Sx/interface). According to such example embodiments the application status request message may be message 10 (the reauthorization request) of FIG. 2. Furthermore, the request message may comprise an indication that the PCRF node is to be informed when the wireless device enters a connected mode or state. According to some of the example embodiments, the indication may be a message type, a trigger event, a cause code, a flag, etc.

According to the example embodiments where the reachability status of the wireless device is determined from a location of the wireless device, the at least one network node may be a PCEF unit, or a mobility management node (e.g., a MME, SGSN, S4-SGSN, ePDG, TWAN, HSGW or SGW over the Gxx/Gx/Sx/ interface). According to such example embodiments, the application status request message may be message 10 of FIG. 2. Furthermore, the request message may comprise an indication that the PCRF node is to be informed of the wireless device's current location and/or if the wireless device changes location. According to some of the example embodiments, if the current location of the wireless device is not a valid location, the PCRF node may be informed or later changes in location to determine if the wireless device has moved to a valid location. According to some of the example embodiments, the indication may be a message type, a trigger event, a cause code, a flag, etc. According to some of the example embodiments, the indication may also comprising information used to identify the location of the wireless device.

Operation 16

The PCRF node is further configured to receive 16, from the at least one network node, the congestion status and/or the reachability status. The receiving unit 301A is configured to receive, from the at least one network node, the congestion status and/or the reachability status. The congestion status and/or reachability status receiving module 16A is configured to receive, from the at least one network node, the congestion status and/or the reachability status.

According to the example embodiment explained in FIG. 2, the PCRF node will only receive the congestion status if a current congestion level of the wireless device has surpassed the congestion threshold. Thus, if the congestion status is not received from the at least one network node, for example, the RCAF, the PCRF node will interpret that as the wireless device being able to receive downlink data with respect to congestion. It should be appreciated that according to some of the example embodiments, the at least one network node, for example the RCAF, may be configured to send the congestion status even if the current level of the congestion is below the congestion threshold.

According to the example embodiment explained in FIG. 2, the PCRF node receives the reachability status in message 10. In FIG. 2, message 10 comprises both the connection state of the wireless device and the current location (or an indication of a location change) of the wireless device.

Operation 18

The PCRF node is also configured to determine 18 if the wireless device is able to receive downlink data based on the congestion status and/or the reachability status. The processing unit 303 is configured to determine if the wireless device is able to receive the downlink data based on the congestion status and/or the reachability status. The ability to receive downlink data determining module 18A is configured to determine if the wireless device is able to receive the downlink data based on the congestion status and/or the reachability status.

According to some of the example embodiments, the ability of the wireless device to receive the downlink data is determined based on congestion. According to such example embodiments, if the PCRF node receives an indication that a congestion level experienced by the wireless device is above the congestion threshold, the PCRF node will determine the wireless device is not able to receive downlink data. In the example provided by FIG. 2, the RCAF node will send the congestion status if a congestion level experienced by the wireless device is higher than the congestion threshold. Thus, in the example provide by FIG. 2, the PCRF node will determine if the wireless device is able to receive downlink data, based on congestion, if the PCRF node has not received a notification from the RCAF node. It should be appreciated that FIG. 2 is merely an example. According to some of the example embodiments, the at least one network node may be configured to send the congestion status, comprising a current congestion level, regardless of whether or not the congestion threshold has been surpassed.

According to some of the example embodiments, the ability of the wireless device to receive the downlink data is determined based on the reachability status, specifically with respect to a connection mode. According to such example embodiments, the PCRF node will receive an indication once the wireless device is in an awake, or non-sleep mode. Thus, the PCRF node will determine that the wireless device is able to receive downlink data, based on a connection mode, once the PCRF node has received the indication that the wireless device is in a connected mode or state.

According to some of the example embodiments, the ability of the wireless device to receive the downlink data is determined based on the reachability status, specifically with respect to a valid location, e.g., a location in which the wireless device is reachable, for example, due to available coverage or operator. According to such example embodiments, the PCRF node will receive an indication of a current location of the wireless device or if the wireless device has changed locations. Thus, the PCRF node will determine that the wireless device is able to receive downlink data, based on the provided location information. In the example provided by FIG. 2, the PCRF node is provided with a cell id of the cell in which the wireless device is currently situated. It should be appreciated that any other form of location information may be provided to the PCRF node, for example, the current position of the wireless device may be determined via a cell id or the BSSID/SSID in a WLAN network, etc.

It should further be appreciated that the ability of the wireless device to receive downlink data may be determined via a connectivity mode, a valid location, or a congestion, individually or in any combination.

Example Operation 20

According to some of the example embodiments, wherein the determining 18 further comprises determining 20 the wireless device is able to receive downlink data if the reachability status indicates that the wireless device is in a connected mode and/or the wireless device is in a valid location, and the congestion status comprises a current congestion level that is lower than the congestion threshold. The processing unit 303 is configured to determine the wireless device is able to receive downlink data if the reachability status indicates that the wireless device is in a connected mode and/or the wireless device is in a valid location, and the congestion status comprises a current congestion level that is lower than the congestion threshold. The ability to receive downlink data determining module 18A is configured to the wireless device is able to receive downlink data if the reachability status indicates that the wireless device is in a connected mode and/or the wireless device is in a valid location, and the congestion status comprises a current congestion level that is lower than the congestion threshold.

According to example operation 20, both the reachability status, for example based on location and/or connectivity, and the congestion status are used to determine the ability of the wireless device to receive downlink data. Example operation 20 is further described in the text corresponding to at least FIG. 2 and operation 18.

Operation 22

If the wireless device is able to receive downlink data, the PCRF node is further configured to transmit 22, to the application server, a notification that the wireless device is able to receive downlink data. The transmitting unit 301B is configured to transmit, to the application server, the notification that the wireless device is able to receive downlink data. The notification transmitting module 22A is configured to transmit 22, to the application server, the notification that the wireless device is able to receive downlink data.

In the example provided by FIG. 2, the notification message is message 12. Once the application server has been notified by the PCRF, the application server knows that the wireless device will be available to receive communications.

Figure 7A:
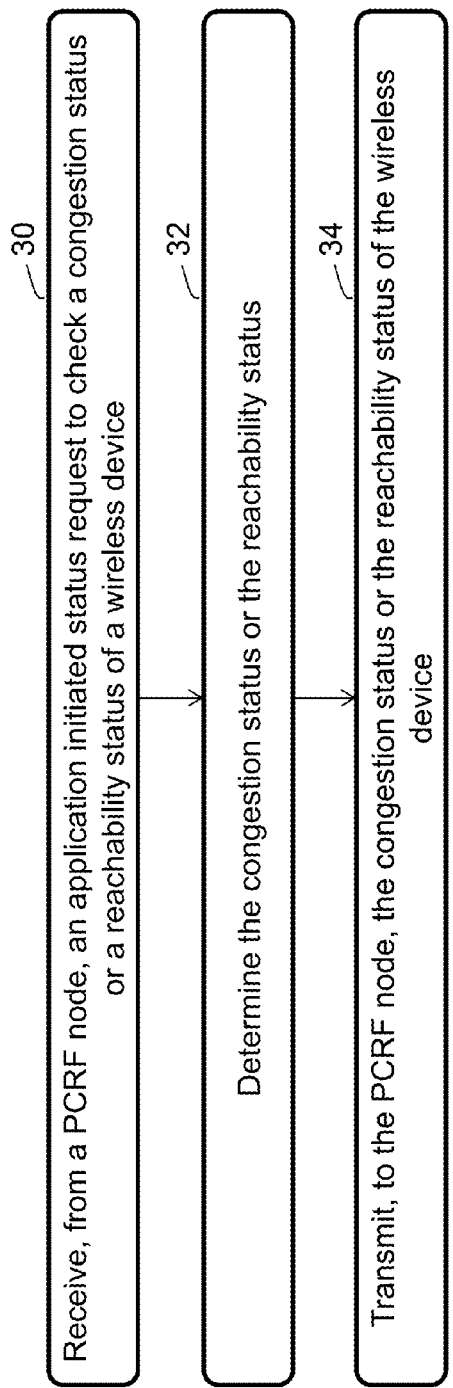
FIG. 7A is a flow diagram depicting example operations performed by the network node of FIG. 4, according to some of the example embodiments.

FIG. 7A is a flow diagram depicting example operations which may be taken by a network node as described herein for monitoring an ability of a wireless device to receive downlink data. It should also be appreciated that FIG. 7A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 7B:
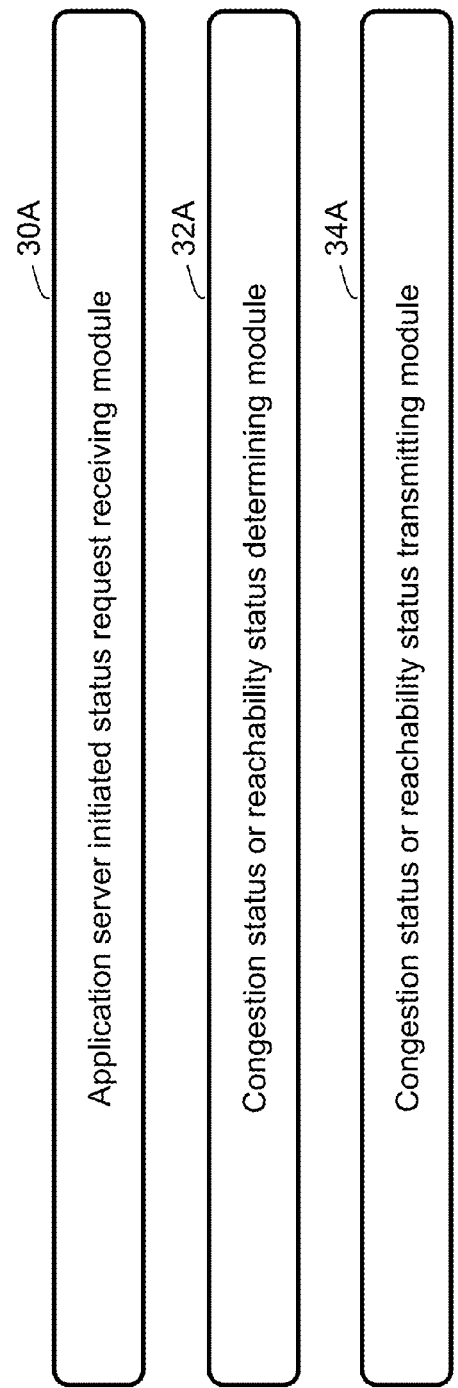
FIG. 7B is a module diagram of the network node of FIGS. 4 and 7A, according to some of the example embodiments.

FIG. 7B is a module diagram describing modules of the network node according to some of the example embodiments herein. The example node operations of the network node will be described below in conjunction with at least FIGS. 2, 4, 7A and 7B.

Operation 30

The network node is configured to receive 30, from the PCRF node, an application server initiated status request to check a congestion status of the wireless device with respect to a congestion threshold or a reachability status of the wireless device. The receiving unit 401A is configured to receive, from the PCRF node, the application server initiated status request to check the congestion status of the wireless device with respect to the congestion threshold or the reachability status of the wireless device. The application server initiated status request receiving module 30A is configured to receive, from the PCRF node, the application server initiated status request to check the congestion status of the wireless device with respect to the congestion threshold or the reachability status of the wireless device.

According to some of the example embodiments the at least one network node may be a RCAF, a PCEF, and/or a mobility management node (e.g., a MME, SGSN, S4-SGSN, ePDG, TWAN, HSGW or SGW over the Gxx/Gx/Sx/ interface). The status request is referred to as an application server initiated status request because the PCRF node is sending the status request based on, i.e., in response to, the request to monitor described in relation to example operation 10 and message 1 of FIG. 2.

According to some of the example embodiments, when the application server initiated status request is to check on the congestion status of the wireless device, the at least one network node is a RCAF node. In such example embodiments, the application server initiated status request may be message 4 of FIG. 2. Furthermore, the application server initiated status request message may comprise the congestion threshold described in relation to operations 12 and 14.

According to some of the example embodiments, a reachability status of the wireless device is determined from a connection state and/or location of the wireless device. Thus, the wireless device may be deemed reachable if it is in a connected state, i.e., not in a sleep mode, and/or if the wireless device is in a valid location, i.e., a location where the wireless device may be contacted.

According to the example embodiments where the reachability status of the wireless device is determined from a connection state, the at least one network node may be a PCEF unit, or a mobility management node (e.g., a MME, SGSN, S4-SGSN, ePDG, TWAN, HSGW or SGW over the Gxx/Gx/Sx/interface). According to such example embodiments the application status request message may be message 10 (the reauthorization request) of FIG. 2. Furthermore, the request message may comprise an indication that the PCRF node is to be informed when the wireless device enters a connected mode or state. According to some of the example embodiments, the indication may be a message type, a trigger event, a cause code, a flag, etc.

According to the example embodiments where the reachability status of the wireless device is determined from a location of the wireless device, the at least one network node may be a PCEF unit, or a mobility management node (e.g., a MME, SGSN, S4-SGSN, ePDG, TWAN, HSGW or SGW over the Gxx/Gx/Sx/interface). According to such example embodiments, the application status request message may be message 10 of FIG. 2. Furthermore, the request message may comprise an indication that the PCRF node is to be informed of the wireless device's current location and/or if the wireless device changes location. According to some of the example embodiments, if the current location of the wireless device is not a valid location, the PCRF node may be informed or later changes in location to determine if the wireless device has moved to a valid location. According to some of the example embodiments, the indication may be a message type, a trigger event, a cause code, a flag, etc. According to some of the example embodiments, the indication may also comprising information used to identify the location of the wireless device.

Operation 32

The network node is further configured to determine 32 the congestion status or the reachability status of the wireless device. The processing unit 403 is configured to determine the congestion status or the reachability status of the wireless device. The congestion status or reachability status determining module 32A is configured to determine the congestion status or the reachability status of the wireless device. Operation 32 is described further in at least the working example of FIG. 2.

According to some of the example embodiments, the congestion status of the wireless device, is determined by comparing a current congestion level of the wireless device with the congestion threshold.

According to some of the example embodiments, the reachability status of the wireless device is determined by determining a connection state of the wireless device. According to some of the example embodiments, the reachability status of the wireless device is determined by determining when the wireless device is in a connected mode or in a non-sleep mode.

According to some of the example embodiments, the reachability status of the wireless device is determined by the location of the wireless device. According to some of the example embodiments, the reachability status of the wireless device comprises an evaluation as to if the wireless device is in a valid location, i.e., a location where the wireless device may be contacted.

Operation 34

The network node is further configured to transmit 34, to the PCRF node, the congestion status or the reachability status of the wireless device. The transmitting unit 401B is configured to transmit, to the PCRF node, the congestion status or the reachability status of the wireless device. The congestion status or reachability status transmitting module 34A is configured to transmit, to the PCRF node, the congestion status or the reachability status of the wireless device.

According to the example embodiment explained in FIG. 2, the PCRF node will only receive the congestion status if a current congestion level of the wireless device has surpassed the congestion threshold. Thus, if the congestion status is not received from the at least one network node, for example, the RCAF, the PCRF node will interpret that as the wireless device being able to receive downlink data with respect to congestion. It should be appreciated that according to some of the example embodiments, the network node, for example the RCAF, may be configured to send the congestion status even if the current level of the congestion is below the congestion threshold.

According to the example embodiment explained in FIG. 2, the PCRF node receives the reachability status in message 10. In FIG. 2, message 10 comprises both the connection state of the wireless device and the current location (or an indication of a location change) of the wireless device.

Figure 8A:
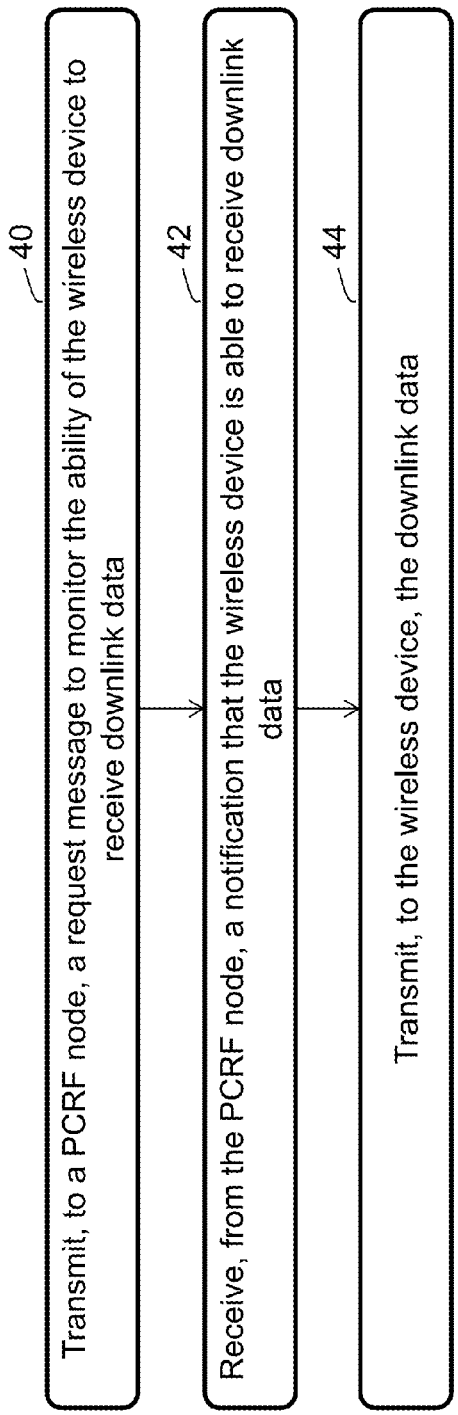
FIG. 8A is a flow diagram depicting example operations performed by the application server, according to some of the example embodiments.

FIG. 8A is a flow diagram depicting example operations which may be taken by an application server as described herein for monitoring an ability of a wireless device to receive downlink data. It should also be appreciated that FIG. 8A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 8B:
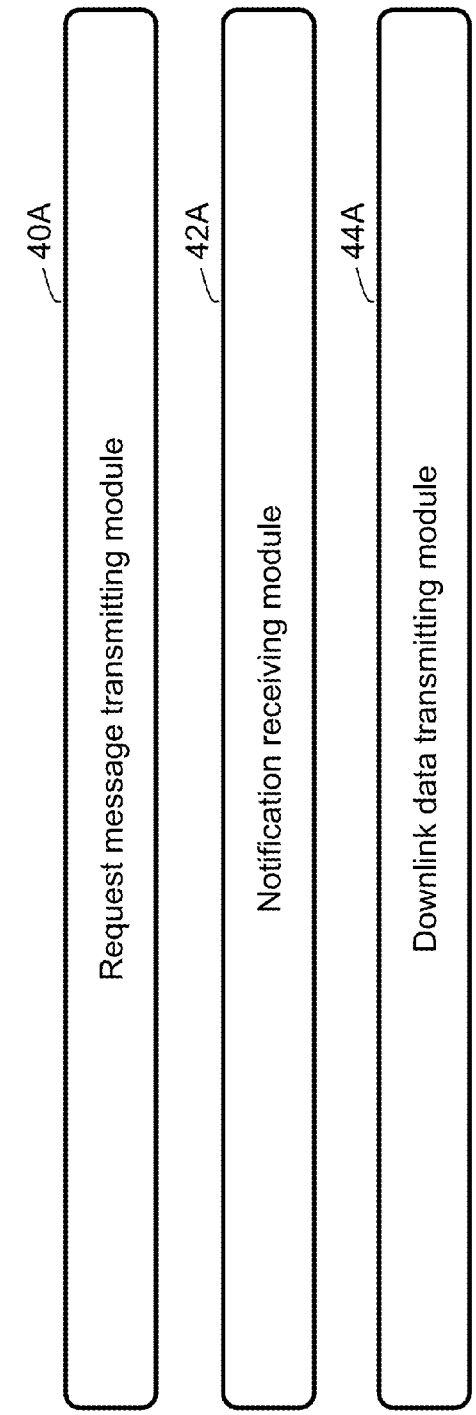
FIG. 8B is a module diagram of the application server of FIGS. 5 and 8A, according to some of the example embodiments.

FIG. 8B is a module diagram describing modules of the network node according to some of the example embodiments herein. The example node operations of the application server will be described below in conjunction with at least FIGS. 2, 5, 8A and 8B.

Operation 40

The application server is configured to transmit 40, to a PCRF node, a request to monitor the ability of the wireless device to receive downlink data. The transmitting unit 501A is configured to transmit, to the PCRF node, the request to monitor the ability of the wireless device to receive downlink data. The request message transmitting module 40A is configured to transmit, to the PCRF node, the request to monitor the ability of the wireless device to receive downlink data.

Thus, instead of trying to attempt to reach the wireless device, the application server may first send the request message to the PCRF node. By first sending the request message to the PCRF node, the application server may avoid a communication attempt with a wireless device that may not be available (e.g., due to being in a sleep mode, being in an invalid location, or being in a congested location, etc.). Therefore, by sending the request message to the PCRF node, the application server may minimize unnecessary network signaling. According to some of the example embodiments, the request message may be message 1 as depicted in FIG. 2.

Operation 42

The application server is further configured to receive 42, from the PCRF node, a notification that the wireless device is able to receive the downlink data based on the wireless device being in a connected mode, being in a valid location and/or a congestion status of the wireless device being lower than a congestion threshold. The receiving unit 501A is configured to receive, from the PCRF node, the notification that the wireless device is able to receive the downlink data based on the wireless device being in a connected mode, being in a valid location and/or a congestion status of the wireless device being lower than a congestion threshold. The notification receiving module 42A is configured to receive, from the PCRF node, the notification that the wireless device is able to receive the downlink data based on the wireless device being in a connected mode, being in a valid location and/or a congestion status of the wireless device being lower than a congestion threshold. FIG. 2 provides an example of such a notification in message 12.

Operation 44

Upon receiving the notification, the application server is further configured to transmit 44, to the wireless device, the downlink data. The transmitting unit 501B is configured to transmit, to the wireless device, the downlink data. The downlink data transmitting module 44A is configured to transmit, to the wireless device, the downlink data.

Therefore, with the notification, the application server knows that the wireless device will be able to receive downlink data or any communications from the application server. Thus, the application server will not create unnecessary signaling.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a Policy and Charging Rules Function (PCRF) node, for monitoring an ability of a wireless device to receive downlink data, the PCRF node being in a wireless communications network, the method comprising:
   the PCRF node receiving a request message to monitor the ability of the wireless device to receive downlink data, wherein the request message was transmitted by an application server;
   the PCRF node transmitting to a network node a status request to check at least one of: i) a congestion status of the wireless device with respect to a congestion threshold and ii) a reachability status of the wireless device, wherein the PCRF node transmits the status request as a result of receiving the request message transmitted by the application server;
   the PCRF node receiving, from the network node, at least one of: i) congestions status information indicating the congestion status of the wireless device and ii) reachability status information indicating the reachability status of the wireless device;
   the PCRF node determining if the wireless device is able to receive downlink data based on at least one of: the congestion status information and the reachability status information; and
   as a result of determining that the wireless device is able to receive downlink data, transmitting, to the application server, a notification that the wireless device is able to receive downlink data, wherein the network node is a Policy and Charging Enforcement Function (PCEF) unit or a mobility management node, and the status request comprises an indication that the PCRF node is to be informed when the wireless device enters a connected mode.

2. The method of claim 1, further comprising determining at least one of: the congestion threshold and a valid location of the wireless device based on a subscription or policy data.

3. The method of claim 1, wherein the network node is a Radio Congestion Aware Function (RCAF) node and the status request comprises the congestion threshold.

4. The method of claim 1, wherein
the network node is a Policy and Charging Enforcement Function (PCEF) unit or a mobility management node, and the status request comprises an indication that the PCRF node is to be informed when the wireless device changes location.

5. The method of claim 1, wherein the determining further comprises determining the wireless device is able to receive downlink data if the reachability status indicates that the wireless device is in a connected mode and/or the wireless device is in a valid location, and the congestion status comprises a current congestion level that is lower than the congestion threshold.

6. The method of claim 1, wherein
the request message is an authorization authentication request (AAR) comprising information indicating that the application server should be notified when the PCRF node determines that the wireless device is reachable, and the method further comprises the PCRF node transmitting to the application server an authorization authentication answer (AAA) in response to the AAR, wherein the AAA comprises information indicating that the PCRF node shall notify the application server that the wireless device is reachable when the PCRF node determines that the wireless device is reachable.

7. The method of claim 1, wherein
the status request transmitted by the PCRF node to the network node comprises: a threshold value, and information instructing the network node to transmit the congestion status information to the PCRF node as a result of the network node determining that a congestion level experienced by the wireless device exceeds the threshold value, the method comprises the PCRF node receiving the congestion status information, and the congestion status information comprises information indicating that the congestion level experienced by the wireless device exceeds the threshold value.

8. The method of claim 7, wherein
the method further comprises the PCRF node transmitting to a second network node a second status request as a result of receiving said request message transmitted by the application server.

9. A Policy and Charging Rules Function (PCRF) node for monitoring an ability of a wireless device to receive downlink data, the PCRF node being in a wireless communications network, the PCRF node comprising:
a receiver for receiving a request transmitted by an application server to monitor the ability of the wireless device to receive downlink data;
a transmitter for transmitting, to a network node, a status request for status information identifying at least one of: i) a congestion status of the wireless device with respect to a congestion threshold and ii) a reachability status of the wireless device; and
a processor, wherein:
the processor is configured to determine if the wireless device is able to receive downlink data based on status information received from the network node, wherein the network node transmitted the status information in response to the status request; and the processor is further configured such that, as a result of determining that the wireless device is able to receive downlink data, the processor employs the transmitter to transmit, to the application server, a notification that the wireless device is able to receive downlink data, wherein the network node is a Policy and Charging Enforcement Function (PCEF) unit or a mobility management node, and the status request comprises an indication that the PCRF node is to be informed with the wireless device enters a connected mode.

10. The PCRF node of claim 9, wherein the processor is further configured to determine the congestion threshold and/or a valid location of the wireless device based on a subscription or policy data.

11. The PCRF node of claim 9, wherein the network node is a Radio Congestion Aware Function (RCAF) node and the status request comprises the congestion threshold.

12. The PCRF node of claim 9, wherein the network node is a Policy and Charging Enforcement Function (PCEF) unit, a mobility management node and the status request comprises an indication that the PCRF node is to be informed of the wireless device's current location and/or if the wireless device changes location.

13. The PCRF node of claim 9, wherein the processor is further configured to determine the wireless device is able to receive downlink data if the reachability status indicates that the wireless device is in a connected mode and/or the wireless device is in a valid location, and the congestion status comprises a current congestion level which is lower than the congestion threshold.

14. A method, in a network node, for monitoring an ability of a wireless device to receive downlink data, the network node being in a wireless communications network, the method comprising:
receiving, from a Policy and Charging Rules Function (PCRF) node, an application server initiated status request to check a congestion status of the wireless device with respect to an congestion threshold or a reachability status of the wireless device;

determining the congestion status or the reachability status of the wireless device; and transmitting, to the PCRF node, the congestion status or the reachability status of the wireless device, wherein the network node is a Policy and Charging Enforcement Function (PCEF) unit or a mobility management node, and the status request comprises an indication that the PCRF node is to be informed with the wireless device enters a connected mode.

15. The method of claim 14, wherein the network node is a Radio Congestion Aware Function (RCAF) node and the application server initiated status request comprises the congestion threshold.

16. The method of claim 14, wherein the network node is a Policy and Charging Enforcement Function (PCEF) unit, a mobility management node and the status request comprises an indication that the PCRF node is to be informed of the wireless device's current location and/or if the wireless device changes location.

17. A network node for monitoring an ability of a wireless device to receive downlink data, the network node being in a wireless communications network, the network node comprising:
 a receiving unit configured to receive, from a Policy and Charging Rules Function (PCRF) node, an application server initiated status request to check a congestion status of the wireless device with respect to a congestion threshold or a reachability status of the wireless device;
 processing unit configured to determine the congestion status or the reachability status of the wireless device; and
 a transmitting unit configured to transmit, to the PCRF node, the congestion status or the reachability status of the wireless device, wherein
 the network node is a Policy and Charging Enforcement Function (PCEF) unit or a mobility management node, and
 the status request comprises an indication that the PCRF node is to be informed with the wireless device enters a connected mode.

18. The network node of claim 17, wherein the network node is a Radio Congestion Aware Function (RCAF) node and the status request comprises the congestion threshold.

19. The network node of claim 17, wherein the network node is a Policy and Charging Enforcement Function (PCEF) unit, a mobility management node and the status request comprises an indication that the PCRF node is to be informed of the wireless device's current location and/or if the wireless device changes location.

20. A method, in an application server, for monitoring an ability of a wireless device to receive downlink data, the application server being in a wireless communications network, the method comprising:
 transmitting a request message to monitor the ability of the wireless device to receive downlink data, wherein the request message is transmitted to a Policy and Charging Rules Function (PCRF) node that is configured to transmit to a network node a status request to check at least one of: i) a congestion status of the wireless device with respect to a congestion threshold and ii) a reachability status of the wireless device, wherein the PCRF node is configured to transmit the status request as a result of receiving the request message;
 receiving, from the PCRF node, a notification that the wireless device is able to receive downlink data based on the wireless device being in a connected mode, being in a valid location and/or a congestion status of the wireless device being lower than a congestion threshold; and
 as a result of receiving the notification, transmitting, to the wireless device, downlink data, wherein
 the network node is a Policy and Charging Enforcement Function (PCEF) unit or a mobility management node, and
 the status request comprises an indication that the PCRF node is to be informed with the wireless device enters a connected mode.

21. An application server for monitoring an ability of a wireless device to receive downlink data, the application server being in a wireless communications network, the application server comprising:
 a transmitting unit configured to transmit a request message to monitor the ability of the wireless device to receive downlink data, wherein the transmitting unit is configured to the request message to a Policy and Charging Rules Function (PCRF) node that is configured to transmit to a network node a status request to check at least one of: i) a congestion status of the wireless device with respect to a congestion threshold and ii) a reachability status of the wireless device, wherein the PCRF node is configured to transmit the status request as a result of receiving the request message;
 a receiving unit configured to receive, from the PCRF node, a notification that the wireless device is able to receive downlink data based on the wireless device being in a connected mode, being in a valid location and/or a congestion status of the wireless device being lower than a congestion threshold; and
 as a result of receiving the notification, the transmitting unit further configured to transmit, to the wireless device, downlink data, wherein
 the network node is a Policy and Charging Enforcement Function (PCEF) unit or a mobility management node, and
 the status request comprises an indication that the PCRF node is to be informed with the wireless device enters a connected mode.

* * * * *

UNITED STATES PATENT AND TRADEMARK OFFICE
CERTIFICATE OF CORRECTION

PATENT NO.        : 10,149,186 B2
APPLICATION NO.   : 14/760598
DATED             : December 4, 2018
INVENTOR(S)       : Emanuelsson et al.

It is certified that error appears in the above-identified patent and that said Letters Patent is hereby corrected as shown below:

On the Title Page

On Page 2, item (56), under "OTHER PUBLICATIONS", in Column 1, Line 17, delete "198." and insert -- 198 --, therefor.

In the Drawings

In Fig. 2, Sheet 2 of 9, Point "1", in Line 1, delete "Authorization Request (AAR)," and insert -- Authorization Authentication Request (AAR), --, therefor.

In Fig. 2, Sheet 2 of 9, Point "2", in Line 1, delete "Authorization Request Answer (AAA)" and insert -- Authorization Authentication Answer (AAA) --, therefor.

In Fig. 2, Sheet 2 of 9, Point "12", in Line 1, delete "Reauthorization RequestRAR)." and insert -- Reauthorization Request (RAR). --, therefor.

In Fig. 2, Sheet 2 of 9, Point "13", in Line 1, delete "Reauthotrization Request Answer (RAA)" and insert -- Reauthorization Answer (RAA) --, therefor.

In Fig. 6A, Sheet 6 of 9, for Step "18", in Line 1, delete "base on" and insert -- based on --, therefor.

In Fig. 7A, Sheet 8 of 9, for Step "30", in Line 1, delete "application initiated" and insert -- application server initiated --, therefor.

In the Specification

In Column 4, Line 17, delete "AAA Authorization Request Answer" and insert -- AAA Authorization Authentication Answer --, therefor.

Signed and Sealed this
Eleventh Day of June, 2019

Andrei Iancu
*Director of the United States Patent and Trademark Office*

CERTIFICATE OF CORRECTION (continued)

In Column 4, Line 18, delete "AAR Authorization Request" and insert -- AAR Authorization Authentication Request --, therefor.

In Column 4, Line 28, delete "GSM/EDGE" and insert -- GSM EDGE --, therefor.

In Column 4, Line 39, delete "PCC Policy Control and Charging" and insert -- PCC Policy and Charging Control --, therefor.

In Column 4, Line 41, delete "Policy Control" and insert -- Policy --, therefor.

In Column 4, Line 44, delete "RAA Reauthorization Request Answer" and insert -- RAA Reauthorization Answer --, therefor.

In Column 6, Lines 13-14, delete "PDN 105." and insert -- PDN. --, therefor.

In Column 7, Line 59, delete "authorization request message (AAR)," and insert -- authorization authentication request message (AAR), --, therefor.

In Column 8, Lines 1-2, delete "authorization request answer (AAA)." and insert -- authorization authentication answer (AAA). --, therefor.

In Column 8, Line 17, delete "sever" and insert -- server --, therefor.

In Column 8, Line 31, delete "RCAF will" and insert -- RCAF 120 will --, therefor.

In Column 9, Line 44, delete "reauthorization request answer (RAA)" and insert -- reauthorization answer (RAA) --, therefor.

In Column 10, Line 36, delete "SWG" and insert -- SGW --, therefor.

In Column 11, Line 22, delete "sever" and insert -- server --, therefor.

In Column 12, Lines 4-5, delete "receive, form" and insert -- receive, from --, therefor.

In Column 12, Line 53, delete "sever" and insert -- server --, therefor.

In Column 14, Line 34, delete "provide by" and insert -- provided by --, therefor.

In Column 18, Line 35, delete "transmitting unit 501A" and insert -- transmitting unit 501B --, therefor.

In the Claims

In Column 22, Line 20, in Claim 9, delete "informed with" and insert -- informed when --, therefor.

In Column 22, Line 59, in Claim 14, delete "informed with" and insert -- informed when --, therefor.

CERTIFICATE OF CORRECTION (continued)
U.S. Pat. No. 10,149,186 B2

In Column 23, Line 24, in Claim 17, delete "informed with" and insert -- informed when --, therefor.

In Column 24, Line 14, in Claim 20, delete "informed with" and insert -- informed when --, therefor.

In Column 24, Line 47, in Claim 21, delete "informed with" and insert -- informed when --, therefor.